United States Patent
Mozumdar et al.

(10) Patent No.: US 11,563,773 B2
(45) Date of Patent: Jan. 24, 2023

(54) METHODS, SYSTEMS, AND COMPUTER READABLE MEDIA FOR SOFTWARE-BASED EMULATION OF MEDIA ACCESS CONTROL SECURITY (MACSEC)

(71) Applicant: Keysight Technologies, Inc., Santa Rosa, CA (US)

(72) Inventors: Suvendu Mozumdar, Kolkata (IN); Kingshuk Mandal, Kolkata (IN); Angshuman Dasgupta, Kolkata (IN); Subrata Sa, Kolkata (IN); Prasenjit Ranjan Adhikary, Kolkata (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 194 days.

(21) Appl. No.: 16/877,436

(22) Filed: May 18, 2020

(65) Prior Publication Data

US 2021/0314351 A1 Oct. 7, 2021

(30) Foreign Application Priority Data

Apr. 4, 2020 (IN) .............................. 202011014993

(51) Int. Cl.
*H04L 9/40* (2022.01)
*H04L 9/08* (2006.01)

(52) U.S. Cl.
CPC ........ *H04L 63/1466* (2013.01); *H04L 9/0891* (2013.01); *H04L 63/0428* (2013.01)

(58) Field of Classification Search
None
See application file for complete search history.

(56) References Cited

U.S. PATENT DOCUMENTS

| | | | |
|---|---|---|---|
| 7,826,381 B1* | 11/2010 | Kastuar | H04L 43/50 370/242 |
| 9,571,283 B2* | 2/2017 | Chopra | H04L 12/462 |
| 2012/0011351 A1* | 1/2012 | Mundra | H04L 47/2441 713/1 |

(Continued)

OTHER PUBLICATIONS

Hauser et al., "P4-MACsec: Dynamic Topology Monitoring and Data Layer Protection with MACsec in P4-SDN," arXiv:1904.07088v1, pp. 1-12 (Apr. 15, 2019).

(Continued)

*Primary Examiner* — Brandon Hoffman

(57) ABSTRACT

A method for software-based emulation of media access control security (MACsec) includes generating, using a software-based emulated MACsec packet generator, a plurality of emulated MACsec packets, each of the emulated MACsec packets including a MACsec header having a packet number field value that remains fixed across the emulated MACsec packets. The method further includes configuring a device under test to accept plural MACsec packets with the same MACsec packet number field value. The method further includes transmitting the emulated MACsec packets to the device under test (DUT). The method further includes determining whether the DUT responds correctly to the emulated MACsec packets given a replay protection configuration of the DUT. The method further includes generating test output based on a result of the determination.

20 Claims, 8 Drawing Sheets

(56) References Cited

U.S. PATENT DOCUMENTS

2016/0036813 A1* 2/2016 Wakumoto .......... H04L 63/0272
 713/171
2020/0204591 A1* 6/2020 Yang ................... H04L 63/0428

OTHER PUBLICATIONS

"IxExplorer User Guide," Ixia, Release 5.50, Part No. 913-0840 Rev. A, pp. 1-1248 (Jun. 2009).

* cited by examiner

METHODS, SYSTEMS, AND COMPUTER READABLE MEDIA FOR SOFTWARE-BASED EMULATION OF MEDIA ACCESS CONTROL SECURITY (MACSEC)

PRIORITY APPLICATION

This application claims the priority benefit of Indian Patent Application No. 202011014993 filed Apr. 4, 2020, the disclosure of which is incorporated herein by reference in its entirety.

TECHNICAL FIELD

The subject matter described herein relates to testing for compliance with and performance of implementations of MAC security protocols. More particularly, the subject matter described herein relates to methods, systems, and computer readable media for software-based emulation of media access control security (MACsec).

BACKGROUND

MACsec is standardized in IEEE standard 802.1AE—Media Access Control (MAC) Security, IEEE 802.1 working group, 2018 and provides secure communication for traffic on Ethernet links. In particular, MACsec provides point-to-point security on Ethernet links between directly connected nodes and can identify and prevent security threats, such as denial of service, intrusion, man-in-the-middle, and playback attacks. MACsec provides security using a two-fold mechanism, which includes both data integrity checking and data encryption. Both of these functions are based on 128/256 bit security keys and processes defined in cipher suites Advanced Encryption Standard-Galois Counter Mode (AES-GCM) 128/256, agreed upon by both ends of a point-to-point Ethernet link. The keys can be used configured or dynamically generated, depending on the mode of security used to enable MACsec. Because MACsec is a security mechanism that applies to traffic transmitted/received at as high as 100% Ethernet line rate, MACsec is implemented at the hardware level.

As Ethernet data rates change, new hardware is required to transmit Ethernet data at the new (faster) data rates. Test systems that test Ethernet hardware are also required to transmit data at each new data rate. Implementing MACsec testing at line rates can be achieved by modifying test system hardware. However, due to the time and expense associated with hardware updates, it may be desirable to test a device under test's MACsec compliance and performance without redesigning the test system hardware.

Accordingly, there exists a need for methods, systems, and computer readable media for software-based emulation of MACsec.

SUMMARY

A method for software-based emulation of media access control security (MACsec) includes generating, using a software-based emulated MACsec packet generators, a plurality of emulated MACsec packets, each of the emulated MACsec packets including a MACsec header having a packet number field value that remains fixed across the emulated MACsec packets. The method further includes configuring a device under test to accept plural MACsec packets with the same MACsec packet number field value. The method further includes transmitting the emulated MACsec packets to the device under test (DUT). The method further includes determining whether the DUT responds correctly to the emulated MACsec packets given a replay protection configuration of the DUT. The method further includes generating test output based on a result of the determination.

According to another aspect of the subject matter described herein, generating the emulated MACsec packets includes generating plural copies of the same emulated MACsec packet.

According to another aspect of the subject matter described herein, generating the emulated MACsec packets includes encrypting payload and 802.1Q portions of the MACsec packets using the software-based emulated MACsec packet generator.

According to another aspect of the subject matter described herein, configuring the DUT to accept plural MACsec packets with the same MACsec packet number field value includes configuring the DUT with a non-zero replay window size and the packet number field value of the emulated MACsec packets is within a range of packet numbers of the replay window, and determining whether the DUT responds correctly to the emulated MACsec packets includes determining whether the DUT processes the MACsec packets when the packet number field value is within the range of packet number values of the replay window.

According to another aspect of the subject matter described herein, configuring the DUT to accept plural MACsec packets with the same MACsec packet number field value includes configuring the DUT with a non-zero replay window size and the packet number field value of the emulated MACsec packets is less than the lower bound of a range of packet numbers of the replay window and determining whether the DUT responds correctly to the emulated MACsec packets includes determining whether the DUT rejects the MACsec packets whose packet number field value is less than the lower bound of the range of packet number values of the replay window.

According to another aspect of the subject matter described herein, configuring the DUT to accept plural MACsec packets with the same packet number field value includes disabling replay protection functionality of the DUT.

According to another aspect of the subject matter described herein, transmitting the emulated MACsec packets to the DUT includes transmitting the emulated MACsec packets using layer 1 and 2 hardware of a network equipment test device.

According to another aspect of the subject matter described herein, transmitting the emulated MACsec packets to the DUT comprises transmitting the MACsec packets at line rate to the DUT.

According to another aspect of the subject matter described herein, the generating of the emulated MACsec packets is performed using a network equipment test device.

According to another aspect of the subject matter described herein, the method includes maintaining a rekey timer, detecting expiration of the rekey timer, in response to expiration of the rekey timer, changing a MACsec secure association key and association number (AN), encrypting payload and 802.1Q portions of the emulated MACsec packets using the changed MACsec secure association key, transmitting the emulated MACsec packets encrypted using the changed MACsec secure association key to the DUT, receiving packets from the DUT, and determining whether the DUT correctly processed the packets encrypted using the changed MACsec secure association key.

According to yet another aspect of the subject matter described herein, a system for software-based emulation of media access control security (MACsec). The system includes a network equipment test device including at least one processor. The system further includes a software-based emulated MACsec packet generator implemented by the at least one processor for generating a plurality of emulated MACsec packets, each of the emulated MACsec packets including a MACsec header having a packet number field value that remains fixed across the emulated MACsec packets. The system further includes a layer 1 and 2 module for transmitting the emulated MACsec packets to a device under test (DUT) configured to accept plural MACsec packets with the same MACsec packet number field value. The system further includes a MACsec packet receiver for determining whether the DUT responds correctly to the emulated MACsec packets given a replay protection configuration of the DUT. The system further includes a test controller for generating test output based on a result of the determination.

According to another aspect of the subject matter described herein, the software-based emulated MACsec packet generator is configured to generate plural copies of the same emulated MACsec packet.

According to another aspect of the subject matter described herein, the software-based emulated MACsec packet generator is configured to encrypt payload and 802.1Q portions of the MACsec.

According to yet another aspect of the subject matter described herein, the DUT is configured with a non-zero replay window size, the software-based emulated MACsec packet generator is configured to create the emulated MACsec packets such that the packet number field value of the emulated MACsec packets is within a range of packet numbers of the replay window, and the MACsec packet receiver is configured to determine whether the DUT processes the MACsec packets when the packet number field value is within the range of packet number values of the replay window.

According to another aspect of the subject matter described herein, the DUT is configured with a non-zero replay window size, the software-based emulated MACsec packet generator is configured to create the emulated MACsec packets such that the packet number field value of the emulated MACsec packets is less than the lower bound of a range of packet numbers of the replay window, and the MACsec packet receiver is configured to determine whether the DUT rejects the MACsec packets whose packet number field value is less than the lower bound of the range of packet number values of the replay window.

According to another aspect of the subject matter described herein, the DUT is configured with replay protection functionality of the DUT disabled.

According to another aspect of the subject matter described herein, the layer 1 and 2 module is configured to transmit the emulated MACsec packets at line rate to the DUT.

According to another aspect of the subject matter described herein, the layer 1 and 2 module is implemented in hardware or firmware.

According to another aspect of the subject matter described herein, the software-based MACsec packet generator is configured to maintain a MACsec rekey timer, detect expiration of the MACsec rekey timer, and in response to expiration of the rekey timer, change a MACsec secure association key and association number (AN), and encrypt payload portions of the MACsec packets using the secure association key. The layer 1 and 2 module is configured to transmit the MACsec packets encrypted with the changed secure association key to the DUT. The MACsec packet receiver is configured to receive packets from the DUT and determine whether the DUT correctly processed the packets encrypted using the changed MACsec encryption key.

According to another aspect of the subject matter described herein, a non-transitory computer readable medium having stored thereon executable instructions that when executed by a processor of a computer control the computer to perform steps is provided. The steps include generating, using a software-based emulated media access control security (MACsec) packet generator, a plurality of emulated MACsec packets, each of the emulated MACsec packets including a MACsec header having a packet number field value that remains fixed across the MACsec packets. The steps further include configuring a device under test to accept plural MACsec packets with the same MACsec packet number field value. The steps further include transmitting the emulated MACsec packets to the device under test (DUT). The steps further include determining whether the DUT responds correctly to the emulated MACsec packets given a replay protection configuration of the DUT. The steps further include generating test output based on a result of the determination.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

With the increasing MACsec deployment in finance, defense, and government sectors, the need for MACsec vendors to do thorough conformance as well as scalability testing of MACsec equipment before deployment is increasing. To perform such a testing, a MACsec test tool is needed which can emulate proper MACsec encrypted traffic patterns as per different cipher suites and generate MACsec encrypted data traffic at line rates (e.g., 25G, 40G, 50G, 100G, 400G). This will help an end user in stress testing of a DUT's MACsec data encrypt/decrypt engine. The tool should also be able to validate whether the DUT is implementing proper decryption and re-encryption. The proposed software-based MACsec emulation system described herein addresses both of these requirements.

Figure 1:
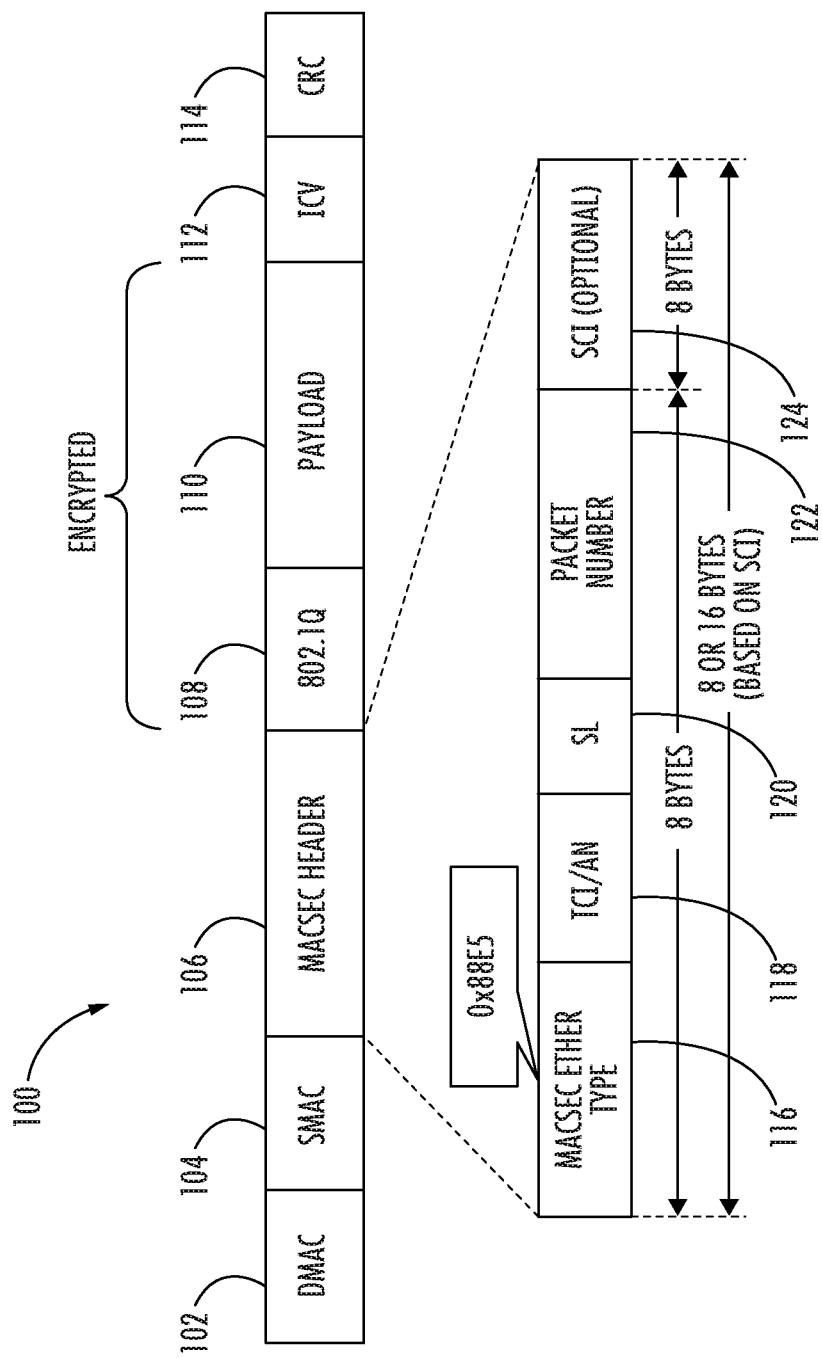
FIG. 1 is a diagram illustrating a MACsec packet.

In order to properly test MACsec devices, the test system described herein is capable of transmitting MACsec packets at any one or more of the above-referenced Ethernet line rates by generating the MACsec packets in software and providing the MACsec packets to Ethernet hardware capable of transmitting the pre-created MACsec packets at the line rates. FIG. 1 is a diagram of MACsec frame or packet. In FIG. 1, MACsec packet 100 includes a destination MAC field 102, a source MAC field 104, a MACsec header 106, an 802.1Q field 108, a MACsec payload field 110, an integrity check value (ICV) field 112, and a cyclic redundancy check (CRC) field 114. MACsec header 106 includes a MACsec Ethertype field 116, a tag control information/association number (TCI/AN) field 118, a short length (SL) field 120, a packet number (PN) field 122, and an optional secure channel identifier (SCI) field 124. According to the MACsec standards, the packet number field 122 is incremented with each MACsec packet. However, incrementing the MACsec packet number field requires encryption of each MACsec packet when generating plural MACsec packets for test purposes because each MACsec packet is unique. The test system described herein generates MACsec packets that have the same value in packet number field 122. The device under test is configured with a non-zero replay window size or with replay protection disabled to accept multiple MACsec packets with the same packet number. By generating MACsec packets that have the same value in the packet number field, a single MACsec packet can be generated, encrypted, replicated, and provided to the MACsec hardware for transmission at line rates.

Two high level test topologies cover most of the desired MACsec test scenarios. In the first topology, only the ingress port of the DUT is MACsec enabled. The ingress port of the DUT receives MACsec encrypted data traffic, decrypts the MACsec traffic as per MACsec logic, and forwards the plaintext traffic to the destination port. The DUT needs to be validated as to whether decryption was properly performed, and, at line rate, how much throughput the DUT can achieve after MACsec decryption processing and whether there is any packet dropped by the DUT.

Figure 2A:
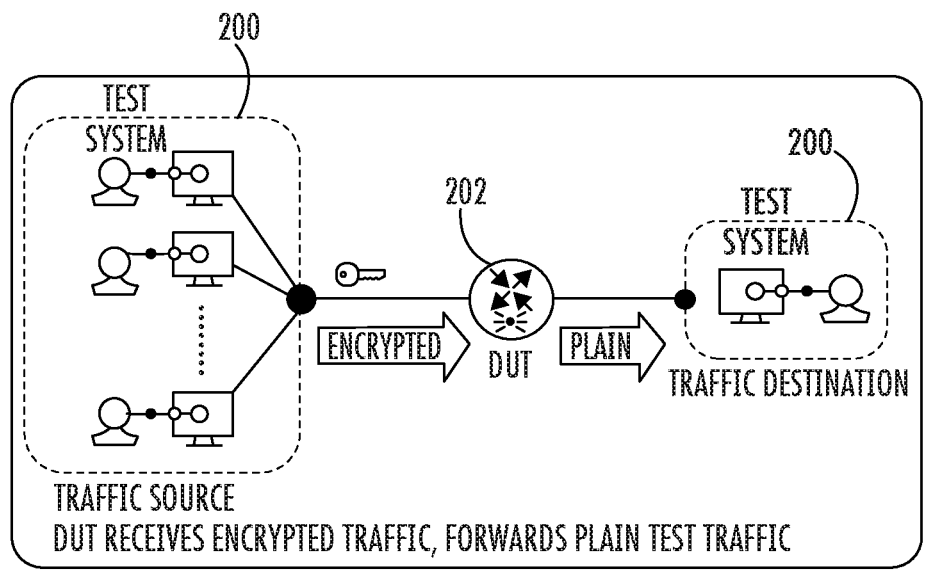
FIG. 2A is a network diagram illustrating an exemplary test setup for testing a DUT's MACsec compliance and performance where the DUT decrypts MACsec traffic and sends plaintext traffic to a receiver side of the test system.

FIG. 2A illustrates the first MACsec test topology for determining whether the DUT properly decrypts MACsec traffic at line rate. Referring to FIG. 2A, a test system 200 generates emulated MACsec packets and transmits the emulated MACsec packets to a device under test 202. Test system 200 may generate emulated MACsec packets in software with the same value of the packet number field in the MACsec header as illustrated in FIG. 1. DUT 202 may be configured with a non-zero replay window size or with replay protection disabled, which allows acceptance and processing of plural MACsec packets with the same packet number. If DUT 202 is configured with replay protection enabled and a non-zero replay window size, MACsec packets with the same packet number will be accepted as long as the values of the packet number fields of the emulated MACsec packets are within a packet number range defined for the replay window. If replay protection is disabled, DUT 202 will accept MACsec packets with the same packet number regardless of the value of the packet number field. In either case, DUT 202 accepts and decrypts the received MACsec packets with same packet number and forwards plaintext packets to test system 200. Test system 200 may validate the plaintext packets by performing CRC or other checks on the packets and may also measure throughput of DUT 202 or packets dropped by DUT 202 in returning the plaintext packets.

Figure 2B:
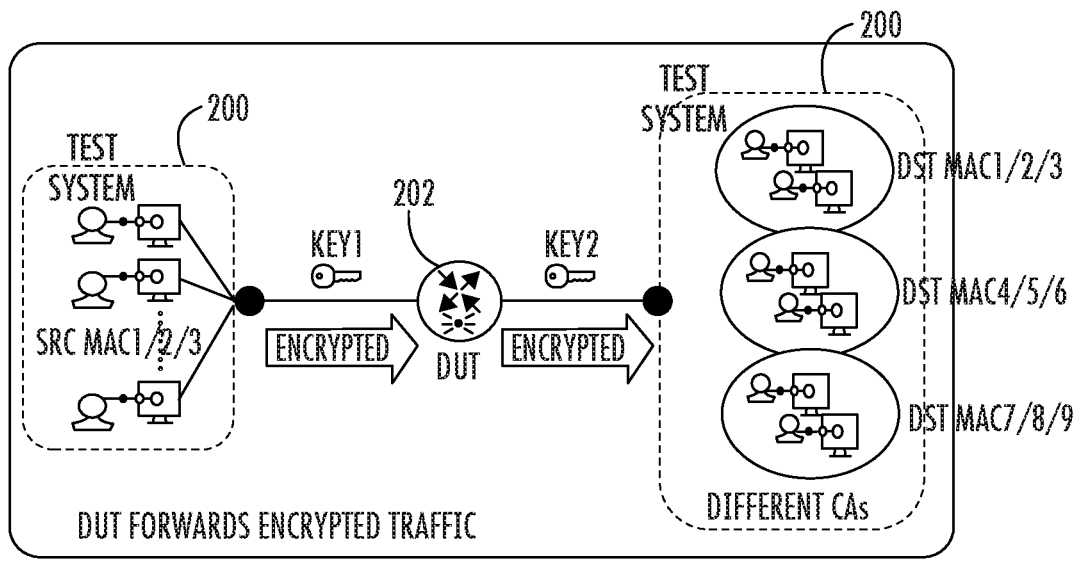
FIG. 2B is a network diagram illustrating an alternate test setup for testing a DUT's MACsec compliance and performance where the DUT decrypts and re-encrypts MACsec traffic with a different key.

In the second test topology, both sides of the DUT are MACsec enabled. DUT 202 receives MACsec encrypted data traffic and re-encrypts the MACsec traffic with a new secure association key (SAK) and sends the re-encrypted traffic to the destination port of the test system. Here both encryption and decryption processing by the DUT need to be validated for conformance as well as from scalability point of view. FIG. 2B illustrates the second test topology. In FIG. 2B, test system 200 generates MACsec encrypted traffic and transmits the MACsec encrypted traffic to DUT 202. Test system 200 generates the MACsec encrypted traffic using a first SAK, key 1. Test system 200 may generate replicates of the same MACsec encrypted packet with the same packet number field value and transmit the replicated MACsec packets to DUT 202 at line rate.

DUT 202 decrypts the MACsec packets using key 1, re-encrypts the MACsec packets using a second SAK, key 2, and transmits the re-encrypted traffic to a destination port of test system 200. Test system 200 receives the re-encrypted MACsec packets and determines whether the packets were validly decrypted and re-encrypted. For example, test system 200 may decrypt the MACsec packets using key 2 and determine whether the CRC, ICV, or other check of the content of the packets indicates that the packets are valid. Test system 200 may also measure throughput of DUT 202 or packets dropped by the DUT 202 when it has to decrypt, re-encrypt, and transmit the re-encrypted packets.

As stated above, MACsec is a layer 2 (L2) functionality, and the encryption and decryption of the traffic going through a port is usually performed at the hardware level. However, as described above, the test system described herein provides a test solution that creates encrypted MACsec traffic patterns at the software level, uses the existing hardware to generate the same crafted patterns at line rate and offers multiple statistics and packet capture support at the receiving port to validate DUT's accuracy and performance in handling MACsec traffic. Performing MACsec packet generation at the software level reduces the time and effort to produce a test system that generates MACsec packets at line rates drastically, when compared with a hardware-only MACsec implementation. Generating MACsec packets in software, enables existing Ethernet line cards to be used to test a device under test's implementation of MACsec at line rates. Exemplary details of software-based MACsec emulation will now be described.

Figure 3:
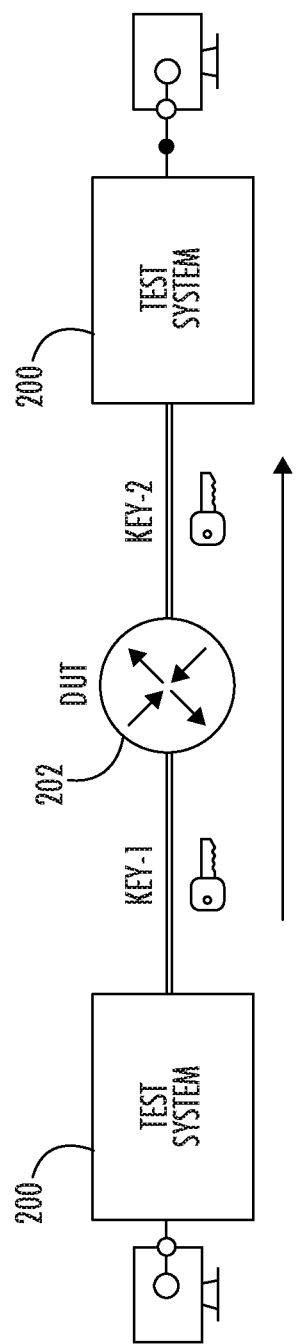
FIG. 3 is a network diagram illustrating a test setup for testing a DUT's MACsec compliance and performance.

FIG. 3 illustrates the MACsec test topology of FIG. 2A where test system 200 generates and sends encrypted frames to DUT 202. DUT 202 re-encrypts the traffic and sends the re-encrypted traffic to test system 200, which validates the re-encrypted frames and measures performance. For the test scenario illustrated in FIG. 3, the following features may be implemented by test system 200 to test the functionality and performance of DUT 202.

1. MACsec Encrypted and/or ICV Protected Frame Generation:

For encryption/integrity protection, an encryption key (128 or 256 bits long) is needed. In one exemplary implementation, the user will provide these keys to test system 200 manually through a configuration interface at test configuration time. A software-based emulated MACsec packet generator of test system 200 will encrypt the data packets at the time of traffic generation and apply the remaining MAC fields to create a complete Ethernet frame. The same packet or frame will be continuously transmitted. However, as stated above, there is a counter in the MACsec header named "PN" or "Packet Number" that is normally incremented for every transmitted packet. Test system 200 implements a static MACsec solution in which the traffic streams are pre-configured at the time of traffic generation. The content, other than the ICV, of packets does not change for every transmitted packet. The value of the PN field remains constant. In one test scenario, all packets will be sent with a user-configurable fixed packet number.

On the receiving side, i.e., the DUT port, there is a MACsec feature referred to as replay protection which checks whether packets with same packet numbers are received within a window of fixed size, referred to as the MACsec replay window. Within the replay window, packet replay (i.e., multiple packets with an identical packet number) is allowed. However, any received packets with a PN value below the lower boundary of the window, defined by the lowest acceptable packet number (LPN) will be discarded. In addition, any received packet with a packet number larger than the largest packet number defined for the replay window will set the higher end of the replay window to the newly received value. This will, in effect, move the window. In one exemplary test configuration, DUT 202 needs to be configured with a replay window size >=1, so that replaying the same packet number will not result in a replay packet being discarded.

Figure 4:
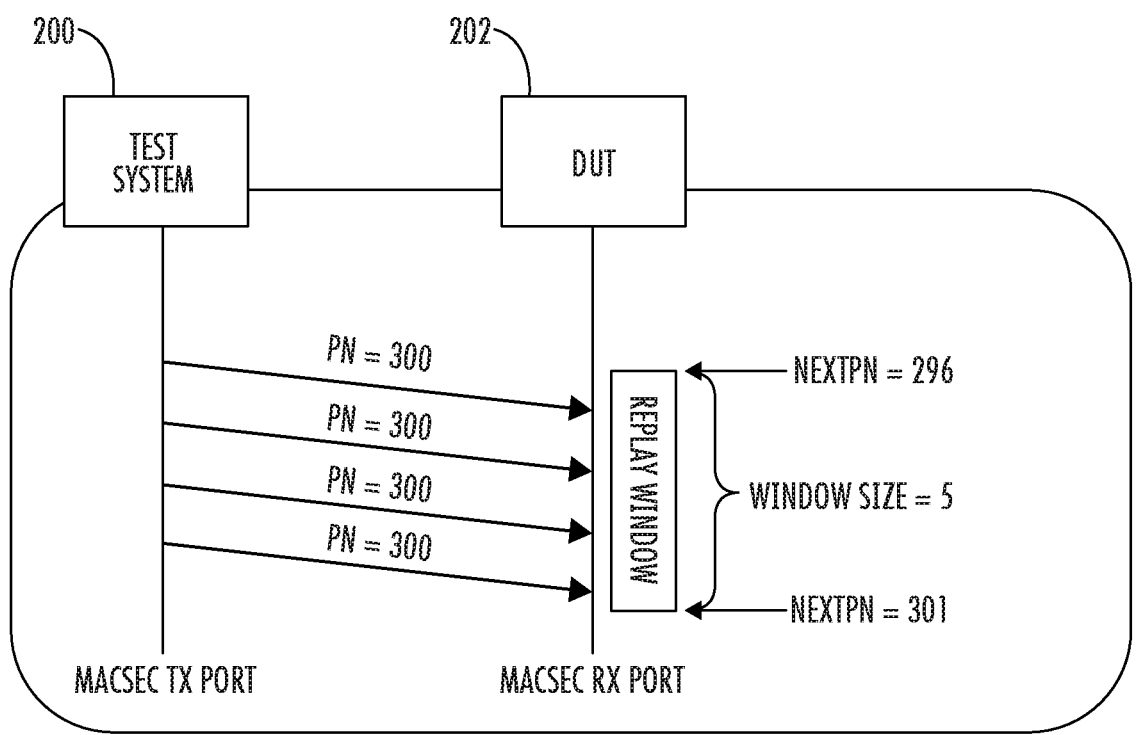
FIG. 4 is a packet flow diagram illustrating exemplary transmission of emulated MACsec packets with packet number field values within a packet number range of a replay window of a DUT.

FIG. 4 illustrates the use of the replay window to allow the DUT to receive multiple MACsec packets with the same packet number. In the illustrated example, DUT 202 is configured with a replay window size of 5, which may be effected via a configuration interface of DUT 202. When the test system 200 sends a packet with PN=300, the next packet number gets set to 301 and the lowest acceptable packet number gets set to 296 (301 minus 5) at the DUT 202. The range of packet numbers from 296 to 301 means that any packet numbers greater than or equal to 296 are valid while next expected packet number is 301.

In the illustrated example, test system 200 sends a sequence of 4 MACsec packets with the packet number being set to 300. Because the packet number 300 is within the packet number range of the replay window size of DUT 202, DUT 202 should accept and process the 4 packets, even though the packets have the same packet number. In another example, DUT 202 may be configured with replay protection disabled. If replay protection is disabled, and test system 200 sends 4 packets with the same packet number as illustrated in FIG. 4, DUT 202 should also accept the packets.

In summary, using a fixed packet number does not violate the IEEE 802.1AE standard if the DUT is configured with either with replay protection disabled or replay protection enabled and a non-zero replay window size. Using a fixed packet number in multiple MACsec packets also does not violate the standards if the DUT is configured with replay protection disabled.

2. Generation of MACsec Packets with Packet Numbers which are Less than a Lower Bound of the Range Defined for the Replay Window:

This feature is to check the accuracy of DUT's replay protection behavior. Test system 200 includes the capability to send packets with PNs which are less than a lower bound of the range defined for the DUT's replay window. Let's consider an example in which the fixed PN is 300, and the DUT's replay window size is 5. In this example, any PN<296 is considered to be an out of window packet by the DUT and will be discarded.

Figure 5:
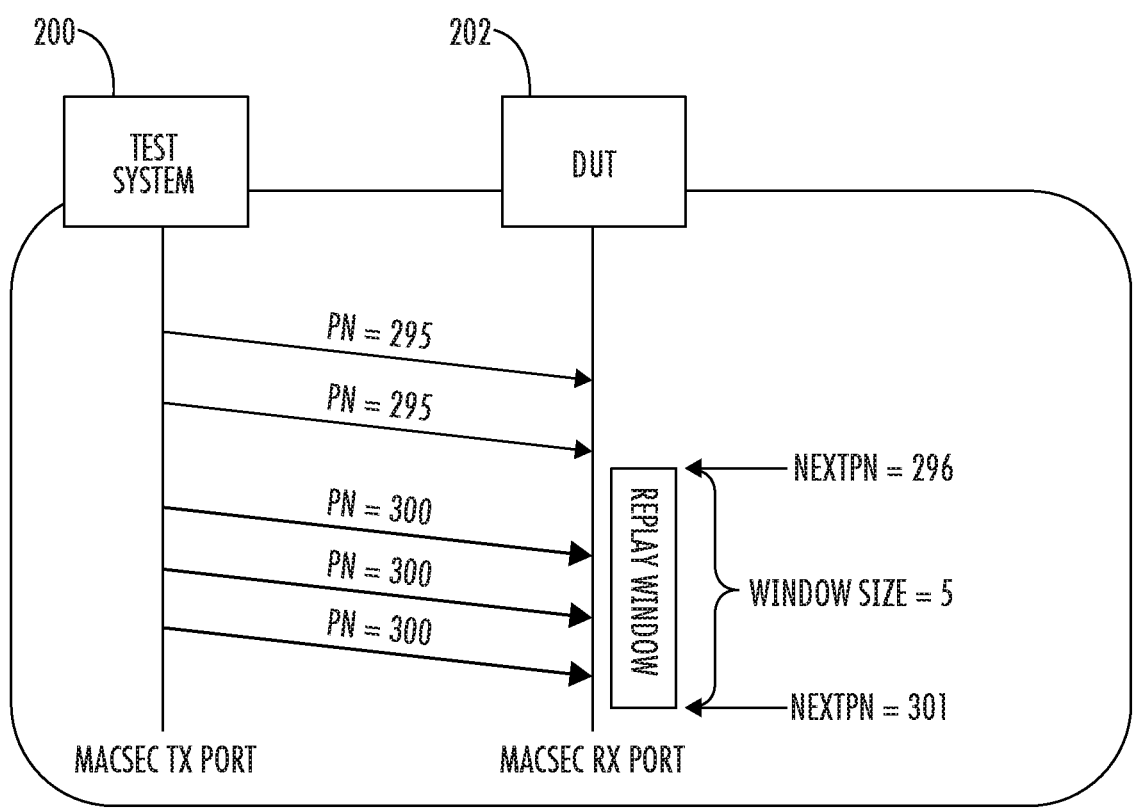
FIG. 5 is a message flow diagram illustrating transmission of emulated MACsec packets to a DUT with packet number field values within and less than a lower bound of a range of packet numbers of a replay window of the DUT.

FIG. 5 illustrates an example where MACsec packets having packet numbers both within and below the lower limit of the replay window are generated by test system 200 and transmitted to device under test 202. Referring to FIG. 5, the replay window size for DUT 202 is configured at 5 with the lowest acceptable packet number being 296 and the next expected number being 301. This means that DUT 202 expects to receive the next packet with packet number 301 and allows reception of packets with a packet number greater than or equal to 296. In the message flow example, test system 200 transmits and sends 2 MACsec packets with packet numbers of 295 to DUT 202. Because the packet number 295 is less than the lower bound of the range of packet numbers for the replay window, DUT 202 should discard the MACsec packets with the packet number 295. Test system 200 also transmits 3 MACsec packets to DUT 202 with packet numbers of 300. Because the packet number 300 is within the range of packet numbers of the replay window, these packets should be accepted and processed by DUT 202.

3. Rekey Support:

The PN field in the MACsec header is 4 bytes, so at some point the PN will hit the max value. When this happens, the PN is wrapped around to 1 and a new encryption key is used for encryption/ICV generation. This is known as the MACsec rekey procedure. Rekeying can be based on a timer as well. Rekeying means that MACsec device can keep changing the encryption key at a certain interval. The test system described herein provides for timer based rekey, without stopping transmission of MACsec traffic to DUT 202. Test system 200 tests rekey performance on the fly at the expiry of a user-configurable timer.

Figure 6:
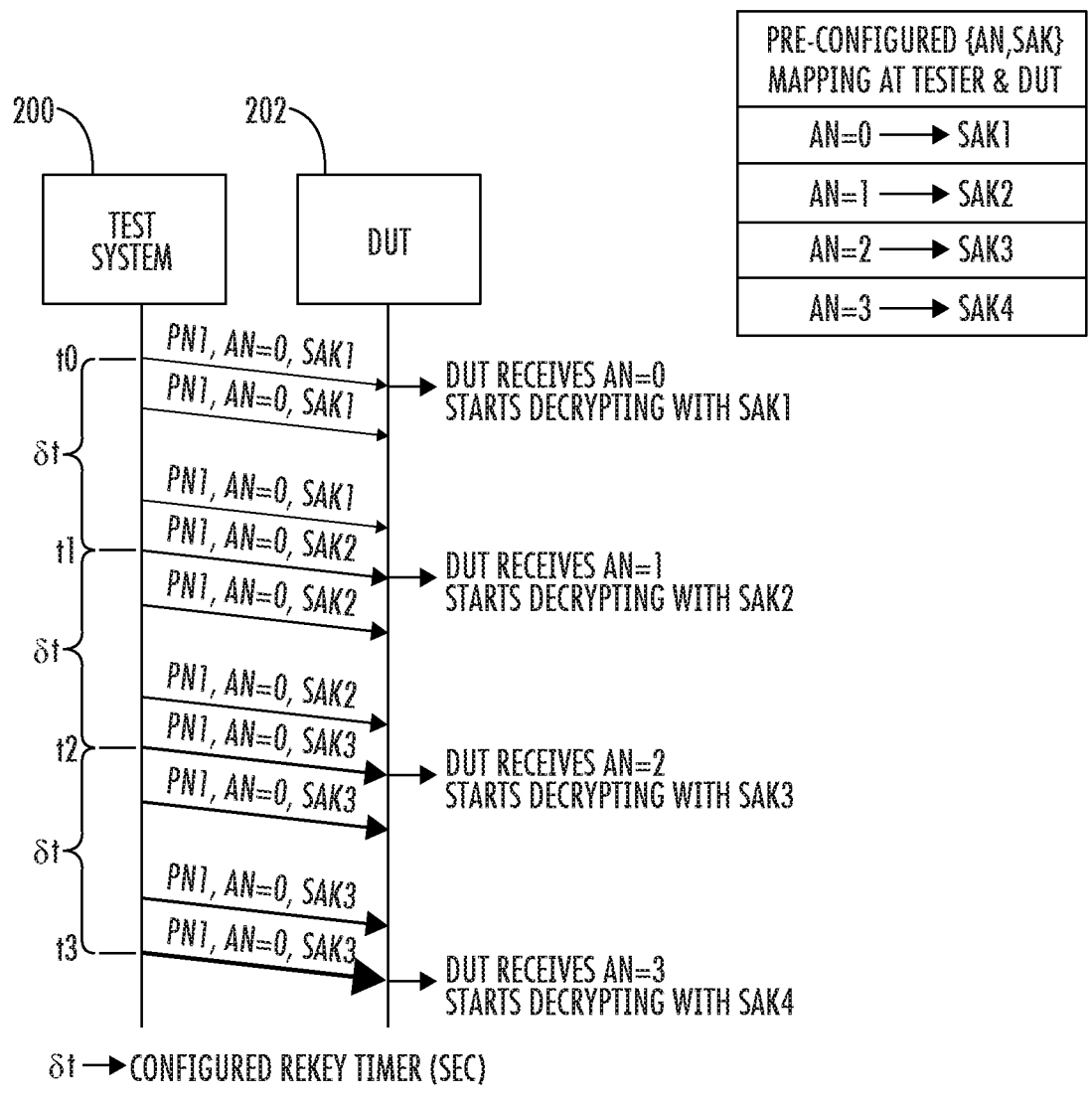
FIG. 6 is a message flow diagram illustrating exemplary messages exchanged between a test device and a device under test in testing the MACsec rekey procedure.

FIG. 6 illustrates exemplary messages exchanged between test system 200 and the device under test 202 in testing the MACsec rekey procedure. Referring to FIG. 6, at time t0, test system 200 sends emulated MACsec packets to DUT 202 where the MACsec packets are encrypted using secure association key SAK1. DUT 202 receives the MACsec packets associated with association number 0 and decrypts the packets with secure association key SAK1. After a time δt, the rekey timer expires and, at time t1, test system 200 sends MACsec packets associated with association number 1 and encrypted using a secure association key SAK2. DUT decrypts the packets with secure association key SAK2. After a time δt elapses, test system 200 sends MACsec packets associated with association number 2 to DUT 202 and encrypted with secure association key SAK3. DUT 202 receives the packets and decrypts the packets with association key SAK3. The process repeats at time t3 where the rekey timer again expires, and test system 200 sends MACsec packets to DUT 202 for association number 3 and encrypted with secure association key SAK4. DUT 202 decrypts the packets using secure association key SAK4. Test system 200 may receive the decrypted packets from DUT 202 and confirm that the packets are properly decrypted. In the case where DUT 202 re-encrypts the decrypted packets, test system 200 may confirm that the packets were properly decrypted and properly re-encrypted.

Figure 7:
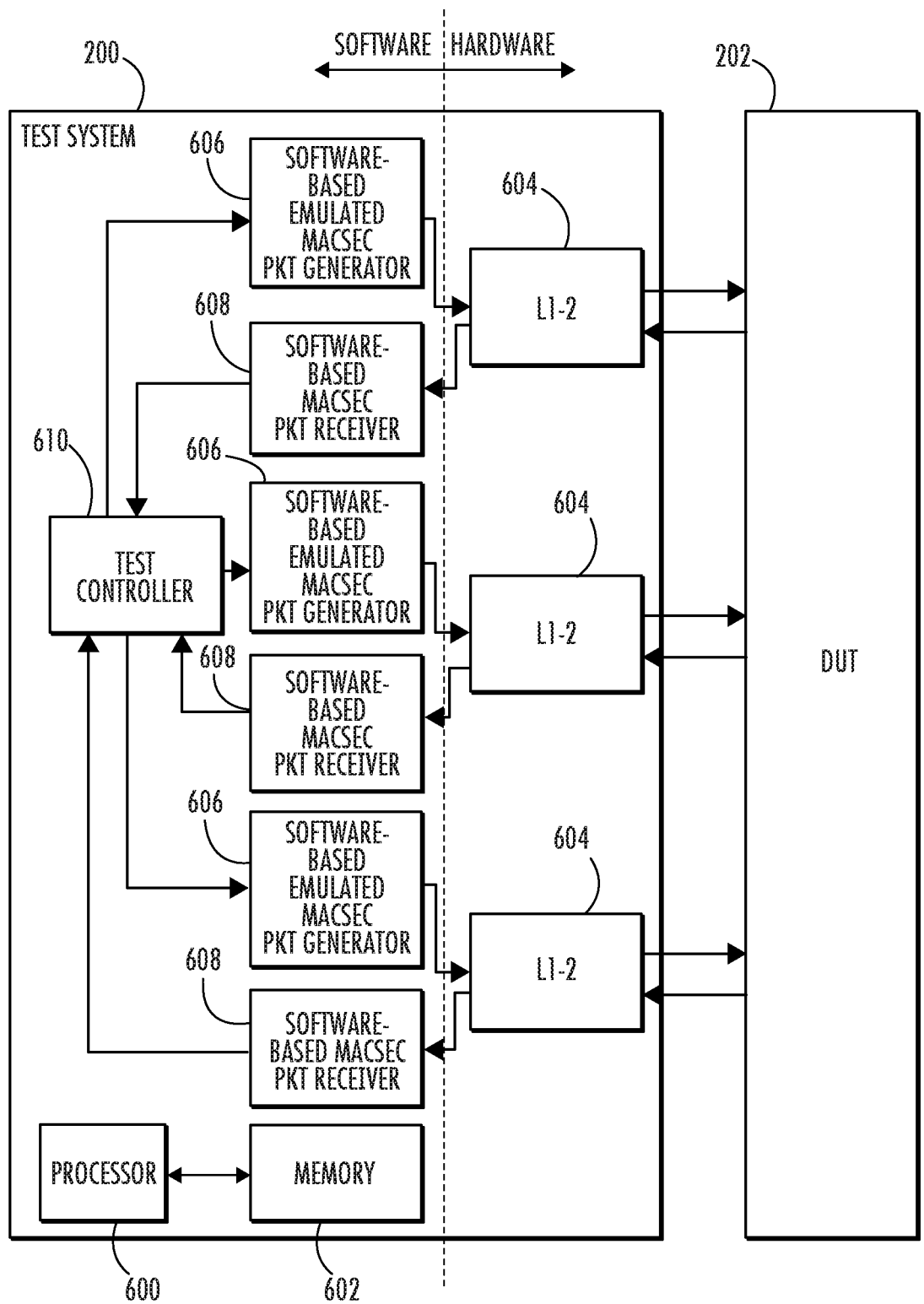
FIG. 7 is a block diagram illustrating a network equipment test device including a software-based emulated MACsec packet generator and hardware for transmitting MACsec frames to a device under test.

FIG. 7 is a block diagram illustrating an exemplary architecture for test system 200 for testing the MACsec functionality and performance of DUT 202. In the illustrated example, test system 200 may include a network equipment test device including at least one processor 600, memory 602, and a plurality of layer 1 and 2 module 604. Processor 600 may be a general-purpose microprocessor that controls the overall operation of test system 200 using software stored in memory 602. Each layer 1 and 2 module 604 may implement Open Systems Interconnect (OSI) layers 1 and 2 and may be implemented in hardware and/or firmware. Each layer 1 and 2 module may be located on a line card (i.e., a printed circuit board for transmitting and receiving data over a line or cable) to transmit packets to and receive packets from device under test 202

Each layer 1 and 2 module 604 in one example may implement MAC functionality for transmitting Ethernet frames to device under test 202 and receiving Ethernet frames from device under test 202. Each layer 1 and 2 module 604 may be capable of transmitting packets at line rate. However, layer 1 and 2 module 604 may not include MACsec functionality, or MACsec functionality of each layer 1 and 2 module 604 may be disabled to enable faster packet transmission. In the test system illustrated in FIG. 7, MACsec functionality is implemented by software-based emulated MACsec packet generators 606 that generate MACsec packets with user-configured packet numbers in the MACsec headers, encrypt the MACsec packets, and provide the MACsec packets to layer 1 and 2 modules 604 for transmission to DUT 202. Because MACsec packet generation is implemented in software and the software generated packet is conveyed to the hardware layers, layer 1 and 2 modules 604 can transmit the MACsec packets with the same packet number and encrypted data to device under test 202 at line rate.

Test system 200 further includes software MACsec packet receivers that receive MACsec packets transmitted by device under test 202 to test system 200 via layer 1 and 2 module 604. Software MACsec packet receivers 608 may receive MACsec packets, decrypt the encrypted portion of the MACsec packets, perform validation of the MACsec packets, and record performance of DUT 202, such as throughput in processing the MACsec packets. MACsec packet receivers 608 may provide the validation results and performance analysis to test controller 610. Test controller 610 may generate output based on the results of the test, such as whether the MACsec packets were successfully validated and the impact on throughput associated with processing the MACsec packets by the DUT.

Figure 8:
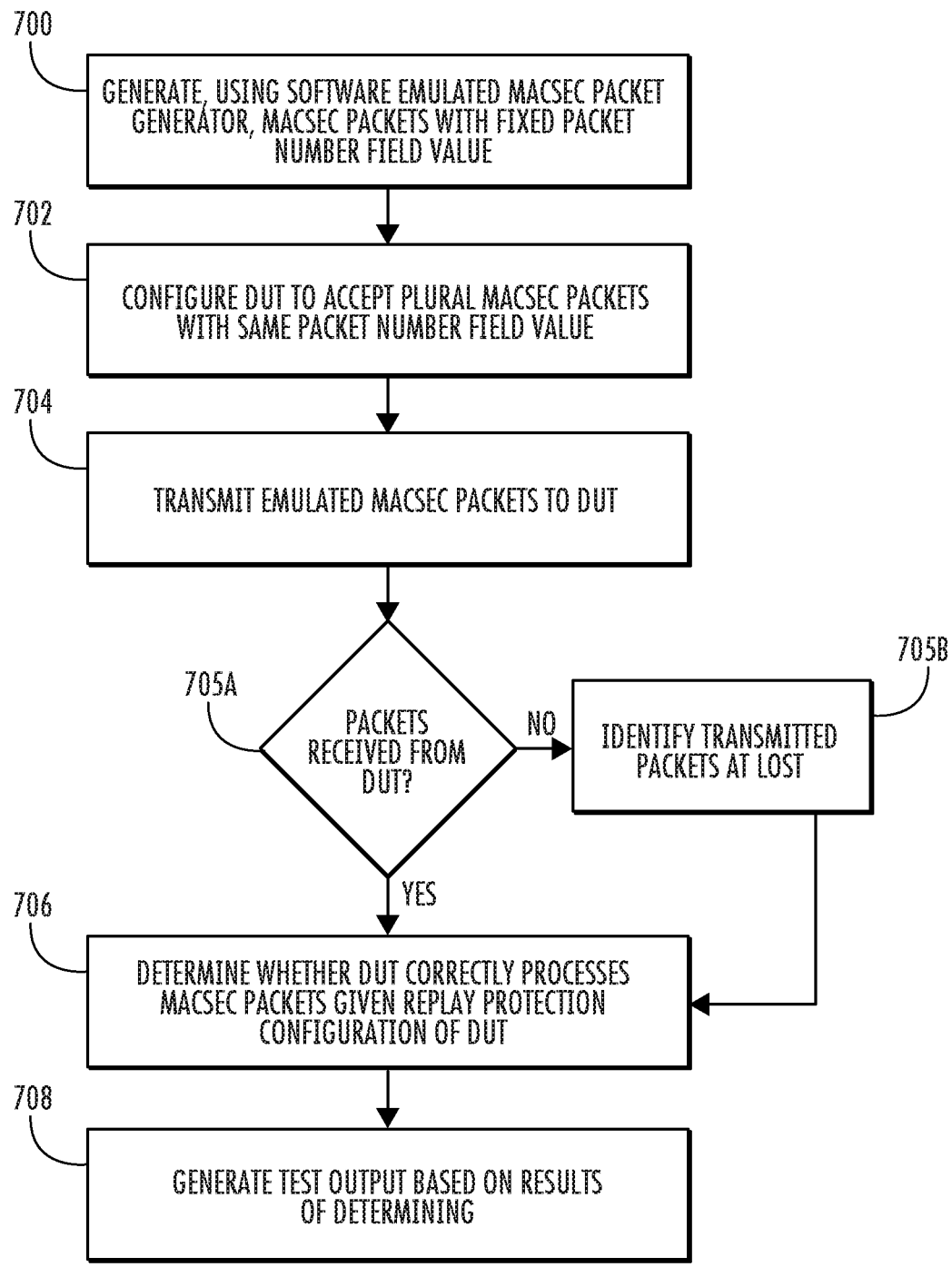
FIG. 8 is a flow chart illustrating an exemplary process for software-based MACsec emulation.

FIG. 8 is a flow chart illustrating an exemplary process for software based emulation of MACsec. Referring to FIG. 8, in step 700, the test system generates, using a software-based emulated MACsec packet generator, emulated MACsec packets with fixed packet number field values. For example, software-based emulated MACsec packet generator 606 illustrated in FIG. 7 may generate emulated MACsec packets of the form illustrated in FIG. 1 where each emulated MACsec packet includes the same fixed packet number field value.

In step 702, the process includes configuring the device under test to accept plural MACsec packets with the same packet number. Configuring the DUT to accept plural MACsec packets with the same packet number may include configuring the DUT with a non-zero replay window size or disabling replay protection functionality of the DUT. For example, as illustrated in FIG. 3, DUT 202 may be configured with a non-zero replay window size and a range of valid packet numbers that can fall within the replay window.

In step 704, the process includes transmitting the emulated MACsec packets to the device under test. For example, test system 200 may transmit emulated MACsec packets generated by the software-based emulated MACsec packet generators to the device under test using layer 1 and 2 module 604. The emulated MACsec packets may include the fixed packet number field value that is within the range of packet number field values in the replay window or less than the lower limit of range of packet number field values of the replay windows, depending on which functionality of device under test 202 is being tested. The emulated MACsec packets may be transmitted at any of the above-listed gigabit Ethernet line rates or any other line rate at which it is desirable to test the functionality and performance of DUT 202.

In step 705A, the process includes determining whether packets are received from the DUT. For example, if the transmitted MACsec packets are MACsec packets with a packet number value within the range of packet number value of the replay window or if replay protection is disabled, DUT 202 should process the MACsec packets and forward packets (either plaintext or re-encrypted packets) to test system 200. The test setup for receiving plaintext packets from the DUT is illustrated in FIG. 2A. The test setup for receiving re-encrypted packets from the DUT is illustrated in FIG. 2B. If the MACsec packets transmitted to the DUT contain a packet number value that is below the lower bound of the replay window or if the packets are otherwise lost, in step 705B, test system 200 may identify the packets as lost.

Once the packets are received or identified as lost, control proceeds to step 706, where the process includes determining whether the DUT correctly processes the MACsec packets given the replay protection configuration of the DUT. For example, if the DUT is configured with replay protection enabled and a non-zero replay window size and the packet number field value of the emulated MACsec packets is within the range of packet number values for the replay window, the correct response of DUT 202 is to process the MACsec packets. Processing the MACsec packets may include decrypting the MACsec packets and transmitting the decrypted plaintext MACsec packets to test system 200 in the case of the test setup illustrated in FIG. 2A. In another example, processing the MACsec packets may include decrypting the MACsec packets, re-encrypting the MACsec packets using a different encryption key, and transmitting the re-encrypted MACsec packets to test system 200.

In yet another example, if the packet number value in the transmitted MACsec packets is below the lower bound of the replay window, DUT 202 should discard the packets. In this case, determining whether the DUT correctly processes the packets may include determining whether the DUT discards the packets (e.g., detecting non-receipt of the packets by the receiving test system 200 when the MACsec packets are transmitted to the DUT.)

Accordingly, if DUT 202 correctly processes the MACsec packets, each software-based MACsec packet receiver may indicate to test controller 610 that the MACsec packets have been correctly processed. If packet number field value in the emulated MACsec packets is less than the lower limit of the range of packet numbers of the replay window, the correct response of DUT 202 is to reject the MACsec packets. Accordingly, in this case, software MACsec packet receiver may determine whether DUT 202 properly rejected emulated MACsec packets whose packet number field values are less than the lower limit of the range of packet number values assigned to the replay window.

In step 708, the process includes generating test output based on results of the determining. For example, test controller 610 may output results of the testing indicating whether or not DUT 202 correctly processed or discarded the MACsec packets whose packet numbers were either within or outside less than the lower limit of the range of MACsec packet numbers assigned to the replay window.

The subject matter described herein achieves at least the following advantages:

The ability to transmit software crafted MACsec traffic at line rate (as high as 400G) over the existing hardware.

The use of the static mode of MACsec, able to simulate different MACsec features compliant with the standard 802.1AE.

The provision of multiple validation methods to test DUT's MACsec conformance and performance behavior.

The test system described herein is helpful for users who are building MACsec solutions or deploying MACsec in large scale customer premises and want to validate conformance/performance of the DUT (MACsec enabled devices). Implementing MACsec packet generation in software will reduce the time and effort required to implement MACsec emulation at line rates.

The software-based MACsec generator achieves high efficiency on existing hardware platforms, where, unlike a hardware-only MACsec device, the encryption/decryption will happen based on preconfigured encryption keys at the software level, and the software-generated MACsec packets with fixed packet number and encrypted payload will be transmitted at the maximum line rate of the underlying hardware load module (e.g., at rates ranging from 1G to 400G).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for software-based emulation of media access control security (MACsec), the method comprising:
   generating, using a software-based emulated MACsec packet generator, a plurality of emulated MACsec packets, each of the emulated MACsec packets including a MACsec header having a packet number field value that remains fixed to the same MACsec packet number field value across the emulated MACsec packets;
   configuring a device under test to accept plural MACsec packets with the same MACsec packet number field value;
   transmitting the emulated MACsec packets to the device under test (DUT);
   determining whether the DUT responds correctly to the emulated MACsec packets given a replay protection configuration of the DUT; and
   generating test output based on a result of the determination.

2. The method of claim 1 wherein generating the emulated MACsec packets includes generating plural copies of the same emulated MACsec packet.

3. The method of claim 1 wherein generating the emulated MACsec packets includes encrypting payload and 802.1Q portions of the MACsec packets using the software-based emulated MACsec packet generator.

4. The method of claim 1 wherein configuring the DUT to accept plural MACsec packets with the same MACsec packet field number value includes configuring the DUT with a non-zero replay window size and the packet number field value of the emulated MACsec packets is within a range of packet numbers of the replay window, and determining whether the DUT responds correctly to the emulated MACsec packets includes determining whether the DUT processes the MACsec packets when the packet number field value is within the range of packet number values of the replay window.

5. The method of claim 1 wherein configuring the DUT to accept plural MACsec packets with the same MACsec packet number field value includes configuring the DUT with a non-zero replay window size and the packet number field value of the emulated MACsec packets is lower than lower bound of a range of packet numbers of the replay window and determining whether the DUT responds correctly to the emulated MACsec packets includes determining whether the DUT rejects the MACsec packets whose packet number field value is lower than the lower bound of the range of packet number values of the replay window.

6. The method of claim 1 wherein configuring the DUT to accept plural MACsec packets with the same packet number field value includes disabling replay protection functionality of the DUT.

7. The method of claim 1 wherein transmitting the emulated MACsec packets to the DUT includes transmitting the emulated MACsec packets using layer 1 and 2 hardware of a network equipment test device.

8. The method of claim 7 wherein transmitting the emulated MACsec packets to the DUT comprises transmitting the MACsec packets at line rate to the DUT.

9. The method of claim 1 wherein the generating of the emulated MACsec packets is performed using a network equipment test device.

10. The method of claim 1 comprising:
    maintaining a rekey timer;
    detecting expiration of the rekey timer;
    in response to expiration of the rekey timer, changing a MACsec secure association key and association number (AN);
    encrypting payload portions of the emulated MACsec packets using the secure association key;
    transmitting the emulated MACsec packets encrypted with the changed secure association key to the DUT;
    receiving packets from the DUT; and
    determining whether the DUT correctly processed the packets encrypted using the changed secure association key.

11. A system for software-based emulation of media access control security (MACsec), the system comprising:
- a network equipment test device including at least one processor;
- a software-based emulated MACsec packet generator implemented by the at least one processor for generating a plurality of emulated MACsec packets, each of the emulated MACsec packets including a MACsec header having a packet number field value that remains fixed to the same MACsec packet number field value across the emulated MACsec packets;
- a layer 1 and 2 module for transmitting the emulated MACsec packets to a device under test (DUT) configured to accept plural MACsec packets with the same MACsec packet number field value;
- a MACsec packet receiver for determining whether the DUT responds correctly to the emulated MACsec packets given a replay protection configuration of the DUT; and
- a test controller for generating test output based on a result of the determination.

12. The system of claim 11 wherein the software-based emulated MACsec packet generator is configured to generate plural copies of the same emulated MACsec packet.

13. The system of claim 11 wherein the software-based emulated MACsec packet generator is configured to encrypt payload and 802.1Q portions of the MACsec packets.

14. The system of claim 11 wherein the DUT is configured with a non-zero replay window size, the software-based emulated MACsec packet generator is configured to create the emulated MACsec packets such that the packet number field value of the emulated MACsec packets is within a range of packet numbers of the replay window, and the MACsec packet receiver is configured to determine whether the DUT processes the MACsec packets when the packet number field value is within the range of packet number values of the replay window.

15. The system of claim 11 wherein the DUT is configured with a non-zero replay window size, the software-based emulated MACsec packet generator is configured to create the emulated MACsec packets such that the packet number field value of the emulated MACsec packets is lower than a lower bound of a range of packet numbers of the replay window, and the MACsec packet receiver is configured to determine whether the DUT rejects the MACsec packets whose packet number field value is lower than the lower bound of the range of packet number values of the replay window.

16. The system of claim 11 wherein the DUT is configured with replay protection functionality of the DUT disabled.

17. The system of claim 11 wherein the layer 1 and 2 module is configured to transmit the emulated MACsec packets at line rate to the DUT.

18. The system of claim 11 wherein the layer 1 and 2 module is implemented in hardware or firmware.

19. The system of claim 11 wherein the software-based emulated MACsec packet generator is configured to maintain a MACsec rekey timer, detect expiration of the MACsec rekey timer, in response to expiration of the MACsec rekey timer, change a MACsec secure association key and association number (AN), and encrypt payload and 802.1Q portions of the MACsec packets using the changed secure association key, wherein the layer 1 and 2 module is configured to transmit the MACsec packets encrypted with the changed secure association key to the DUT, and wherein the MACsec packet receiver is configured to receive packets from the DUT and determine whether the DUT correctly processed the packets encrypted with the changed secure association key.

20. A non-transitory computer readable medium having stored thereon executable instructions that when executed by a processor of a computer control the computer to perform steps comprising:
- generating, using a software-based emulated media access control security (MACsec) packet generator, a plurality of emulated MACsec packets, each of the emulated MACsec packets including a MACsec header having a packet number field value that remains fixed to the same MACsec packet number field value across the MACsec packets;
- configuring a device under test to accept plural MACsec packets with the same MACsec packet number field value;
- transmitting the emulated MACsec packets to the device under test (DUT);
- determining whether the DUT responds correctly to the emulated MACsec packets given a replay protection configuration of the DUT; and
- generating test output based on a result of the determination.

* * * * *